United States Patent [19]
Maruyama et al.

[11] Patent Number: 5,105,654
[45] Date of Patent: Apr. 21, 1992

[54] METHOD FOR INSPECTING LEAKAGE OF SEALED CONTAINER

[75] Inventors: Minoru Maruyama; Takahiko Kagawa; Tahiko Inukai, all of Tokyo; Michio Nonaka; Kiyoshi Kajiwara, all of Tokyo, Japan

[73] Assignee: Taiyo Fishery Co., Ltd., Tokyo, Japan

[21] Appl. No.: 642,140

[22] Filed: Jan. 15, 1991

Related U.S. Application Data

[63] Continuation of Ser. No. 392,211, Aug. 10, 1989, abandoned.

[30] Foreign Application Priority Data

Aug. 22, 1988 [JP] Japan .................. 63-207511

[51] Int. Cl. ................................. G01M 3/26
[52] U.S. Cl. ................................. 73/49.3
[58] Field of Search .............. 73/49.3, 52, 492; 324/207.11

[56] References Cited

U.S. PATENT DOCUMENTS

| | | | |
|---|---|---|---|
| 3,991,622 | 11/1976 | Oowada | 73/49.3 |
| 4,326,408 | 4/1982 | Kanoh | 73/49.3 |
| 4,663,964 | 5/1987 | Croce | 73/49.3 |
| 4,709,578 | 12/1987 | Iwasaki et al. | 73/49.3 |
| 4,715,215 | 12/1987 | Perhach et al. | 73/49.3 |
| 4,771,630 | 9/1988 | Croce et al. | 73/49.3 |
| 4,774,830 | 10/1988 | Hulsman | 73/49.3 |
| 4,803,868 | 2/1989 | Vinton et al. | 73/49.3 |
| 4,899,574 | 2/1990 | Potteiger | 73/49.3 X |
| 4,901,558 | 2/1990 | Leining et al. | 73/49.3 |
| 4,930,342 | 6/1990 | McDaniel | 73/49.3 |
| 4,955,226 | 9/1990 | Beaty et al. | 73/49.3 |

FOREIGN PATENT DOCUMENTS

| | | | |
|---|---|---|---|
| 125090 | 11/1978 | Japan | 73/52 |
| 127438 | 7/1985 | Japan | 73/49.3 |
| 202340 | 10/1985 | Japan | 73/49.3 |
| 202342 | 10/1985 | Japan | 73/49.3 |
| 233524 | 11/1985 | Japan | 73/49.3 |

*Primary Examiner*—Jerry W. Myracle
*Attorney, Agent, or Firm*—Frishauf, Holtz, Goodman & Woodward

[57] ABSTRACT

There is disclosed a method for inspecting leakage of a sealed container which is effectively used for detecting a leaking place such as a pin hole, crack, etc. of a sealed container which contains foods, pharmaceuticals, chemical industrial products, etc. A method for inspecting leakage of a sealed container according to the present invention comprises changing an internal pressure of a vacuum chamber provided with an eddy-current displacement sensor to a predetermined degree of vacuum from a normal pressure after putting a sealed container to be inspected having a conductive material on at least at a portion of the container in the chamber; detecting an amount of expansion of the sealed container at the degree of vacuum in time sequence by the eddy-current displacement sensor; and determining any change in the amount of expansion after a time when the detected amount of expansion shows the maximum value, thereby to determine any pin hole formed in the sealed container.

5 Claims, 1 Drawing Sheet

METHOD FOR INSPECTING LEAKAGE OF SEALED CONTAINER

This application is a continuation of application Ser. No. 07/392,211, filed Aug. 10, 1989, now abandoned.

BACKGROUND OF THE INVENTION

1. Field of the Invention

This invention relates to a method for inspecting leakage of a sealed container, and more particularly to an inspection method effectively used for inspecting a leaking place such as a pin hole, a crack, etc. of a sealed container containing foods, pharmaceuticals, chemical industrial products or the like.

2. Description of the Prior Art

In the food industry, there are generally used containers of a type which are sealed after foods are filled therein and then sterilized by heating, or containers of a type which are sealed after foods are filled therein under a bacteria-free condition. In these containers, if there occurs a poor sealing, a pin hole or the like, air tends to flow into the containers through the pin hole, etc. from outside and a bacterial contamination takes place. As a result, the food contents of the containers are oxidized, changed in quality, or corrupted. In some cases, it turns out to be a significant problem endangering human life.

Therefore, in the food industry or container manufacturing industry, many attempts have been made in order to develop an improved art for sealing with a hope to provide a perfect sealing of a container, an improved art for inspecting the sealing of a container, and a related instrument, device, apparatus, etc. Representative examples thereof are as follows.

(1) One of the representative methods for inspecting leakage of a food can using a metallic can is known as a beat inspecting method. According to this method, an objective container is beaten with a metallic bar and the sealing is inspected by checking with the beating sound. However, this beat inspecting method is inapplicable to a compound container of plastic material with aluminum foils laminated thereon.

(2) As another example, there is a method for inspecting the sealing of a container, in which an objective container is formed with a hole, the peripheral area of the opening portion of the hole is sealed with a rubber material or the like and then, the container is sunk into water, and thereafter, air is sent into the hole in order to raise the internal pressure of the container and finally, generation of an air bubble from the container is checked. This method, however, has the shortcoming in that breakage of the objective container is unavoidable.

(3) In a retort food, there is employed a method in that a bag-shaped container formed of a laminated film of aluminum foil and plastic, or a plastic film vapor deposited with aluminum is used, and air is removed from the container after the container is filled with foods, or otherwise an inert gas such as a nitrogen gas or a carbon dioxide gas or a mixture of a nitrogen gas and a carbon dioxide gas is charged into the container after air is removed from the container, and then the container is sealed.

As a seal inspecting method of a retort food, there is employed a method in that an objective container containing food therein is kept for two to three weeks at a normal temperature of 25° C. to 40° C. and any expansion of the objective container caused by bacterial contamination or any oozing-out of a liquid content filled in the container, which tends to occur when imperfect sealing, pin-hole, etc. are taken place, is inspected by eye. However, any of the above-mentioned methods has the problems in that many days are required for carrying out this inspection and a large stock of the objective containers is required.

(4) As still another method for inspecting any leakage, there is known a method in that a container having a confirmed perfect sealing and an objective container are accommodated in two vacuum chambers which are perfectly sealed and separated, and thereafter, any change of an internal pressure of the vacuum chambers, which tends to occur when an imperfect sealing of the objective container, a pin-hole, etc. are detected, by using a so-called pressure sensor under a predetermined reduced pressure. However, this method again has the shortcoming in that when moisture is attached to the external part of the container, a correct leakage inspection is difficult to obtain because the internal pressure of the chambers is also readily changed owing to evaporation of the moisture when the pressure is reduced.

(5) There is also a method for determining any leakage in that a vacuum chamber is filled with water, and after the objective container is dipped in the water, the internal pressure of the chamber is reduced, and finally, any bubble or any oozing-out of the content of the objective container is inspected. However, this method has the problem that an additional procedure for drying the container is required after inspection because the objective container is wet with the water.

As described above, the conventional inspecting methods have the various problems in that the objective container is limited, a correct inspection is difficult to obtain, the manner for carrying out the method is complicated and a long period of time is required for carrying out the method, and so on.

SUMMARY OF THE INVENTION

An object of the present invention is to provide a method for inspecting leakage of a sealed container which is applicable to any desirable sealed container irrespective of its forming material, shape, content, etc., and in which objective containers can be individually, easily, rapidly and correctly inspected through a simple procedure.

The above object can be achieved by providing a method for inspecting leakage of a sealed container comprising changing an internal pressure of a vacuum chamber provided therein with an eddy-current displacement sensor to a predetermined degree of vacuum from a normal pressure after putting a sealed container to be inspected having a conductive material on at least at a portion of the container in the chamber; detecting an amount of expansion of said sealed container at said degree of vacuum over a time sequence by said eddy-current displacement sensor; and determining whether any change occurs or not in the amount of expansion after a time when the detected amount of expansion reaches a maximum value, thereby to determine any pin hole formed in said sealed container.

Not only an eddy-current displacement sensor, but any kind of sensors that can measure very small displacement are useful in this method. An infrared sensor, a supersonic wave sensor, a laser beam sensor, an optical sensor, etc. are as useful as an eddy-current displacement sensor in this leakage detecting method.

According to the method for inspecting leakage of a sealed container of the present invention, this method is applicable to any desirable sealed container irrespective of its forming material, shape, content, etc., and any pin hole formed in the objective containers can be individually, easily, rapidly and correctly inspected.

Function

In the method of the present invention, as described above, in the case that an internal pressure of a vacuum chamber is maintained in a predetermined degree of vacuum where the sealed container shows the maximum value of expansion, the maximum amount of expansion can be maintained when the container has no pin hole, etc., and on the contrary, when the container has a pin hole, etc., the amount of expansion is reduced from the maximum value over a time sequence. As this change over time can correctly be detected by an eddy-current displacement sensor, it can correctly be determined whether a sealed container has a pin hole or not.

The above and other objects and features of the present invention will be apparent from the following detailed description and appended claims when taken in conjunction with the accompanying drawings.

DETAILED DESCRIPTION OF THE INVENTION

One preferred mode of the present invention will now be described.

First, one example of a leak inspecting apparatus for a sealed container, which is employed in this mode for carrying out the method of the present invention will be described with reference to the accompanying drawings.

Figure 1:
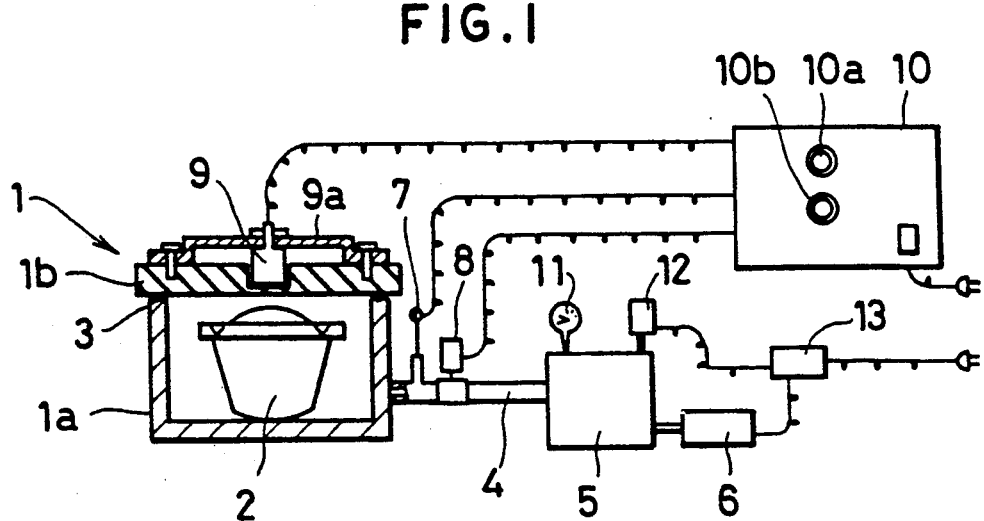
FIG. 1 is a schematic view of a leak inspecting apparatus which is employed for carrying out a method of the present invention.

FIG. 1 is a schematic view of the leak inspecting apparatus. Reference numeral 1 shown in section in the figure generally denotes a vacuum chamber for accommodating therein a sealed container 2 as an object to be inspected. The chamber 1 includes a chamber section 1a and a lid member 1b. Interposed between the chamber section 1a and the lid member 1b is an O-ring 3 adapted to keep the chamber 1 air tight.

The chamber section 1a is connected to a vacuum pump 6 through a piping 4 and a buffer vacuum tank 5. The piping 4 is provided with a pressure sensor 7 for detecting an internal pressure of the chamber 1 and a solenoid valve 8 for opening and closing the piping 4.

Further, the lid member 1b is provided with an eddy-current displacement sensor 9 secured to a central position of an upper part thereof through a support member 9a.

Furthermore, the pressure sensor 7, the solenoid valve 8 and the eddy current displacement sensor 9 are electrically connected with a control device 10 respectively. By virtue of the foregoing arrangement, the interior of the chamber 1 can correctly be maintained in a desired degree of vacuum, and at the same time an output voltage of the eddy-current displacement sensor 9 is detected so that there can be determined whether there is a cause of leakage such as a pin hole, etc. in the container 2. The control device 10 is provided with a first lamp 10a which is lighted up when the amount of leakage is large and a second lamp 10b which is lighted up when the amount of leakage is small.

Also, the vacuum tank 5 is provided with a pressure gauge 11 and a pressure sensor 12. The pressure sensor 12 as well as the vacuum pump 6 are electrically connected to a control switch 13 so that the interior of the vacuum tank 5 can always be maintained in a desired degree of vacuum.

In the case that the method of the present invention is carried out by using the above-mentioned apparatus, first, as shown in FIG. 1, the sealed container 2 is placed in a predetermined position within the vacuum chamber 1. Thereafter, the solenoid valve 8 is activated so that the degree of vacuum in the vacuum chamber 1 is changed from a normal pressure to a predetermined degree of vacuum in order to expand the container 2. And the interior of the chamber 1 is maintained in the aforementioned predetermined degree of vacuum and the amount of expansion (amount of an increase in height) of the sealed container is detected by the eddy-current displacement sensor 9 over a time sequence in the aforementioned degree of vacuum.

When the change of the amount of expansion after a time point where the detected amount of expansion (output voltage) shows a maximum value is achieved, the maximum amount of expansion (maximum output voltage) is maintained provided that there are no pin holes, etc. in the container. On the contrary, if there is a pin hole, etc., the amount of expansion (output voltage) is reduced over a time sequence after the maximum value is detected. Therefore, by detecting the latter expansion change, there can be determined whether there is a pin hole, etc. in the sealed container 2.

Figure 2:
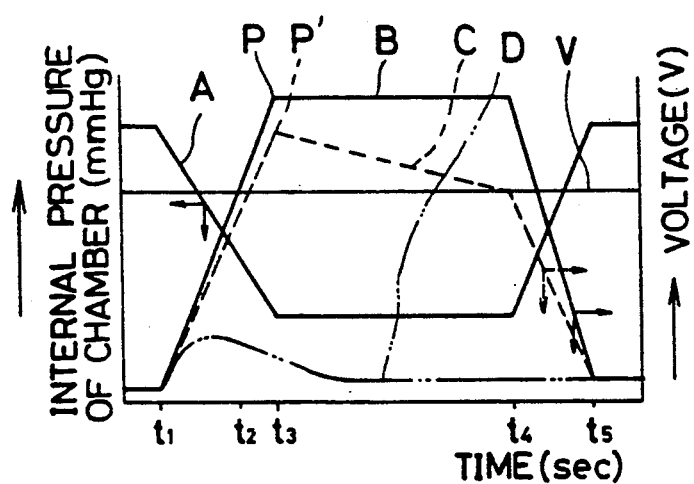
FIG. 2 is a graph showing change over time of the amount of expansion of a sealed container.

FIG. 2 is a graph which concretely shows examples of change of the amount of expansion in order to enhance an easy understanding.

In FIG. 2, the horizontal axis shows time (sec.), the left-hand vertical axis shows degree of vacuum (mmHg) in a chamber and the right-hand vertical axis shows an output voltage of an eddy-current displacement sensor corresponding to the degree of expansion of a container.

In the figure, A denotes a graph of the change of an internal pressure of the chamber, B and C denote graphs of the change of an amount of expansion of the container accommodated in the chamber which is changed in pressure according to the graph A. B represents a case where there are no pin holes, etc., whereas C represents a case where there are pin holes, etc.

An air removal step is started at time $t_1$, a predetermined degree of vacuum is reached at time $t_3$, said degree of vacuum is maintained until time $t_4$, and thereafter, it is leaked into atmosphere to completely return to a normal pressure at time $t_5$ (graph A). This degree of vacuum is properly selected in accordance with the kind of objective containers.

The amount of expansion of a container having no pin hole, etc. at the time zone from $t_1$ to $t_5$ will be described with reference to the graph B showing the change of the amount of expansion. The amount of expansion is increased as the air removal is progressed in the chamber, it reaches the maximum value P at time $t_3$ and the amount of expansion is maintained in that level until time $t_4$.

On the other hand, the amount of expansion of a container having a pin hole, etc. (hereinafter sometimes referred to as the "leak can") in the same time zone as above likewise shows the maximum value P' at time $t_3$ as shown in the graph C. In this case, however, the amount of expansion is gradually reduced in time sequence until it reaches time $t_4$. The degree of gradual reduction (inclination) is larger as the cause for leakage such as a pin hole, etc. becomes larger.

Before the degree of pressure reduction in the chamber 1 reaches a predetermined pressure level, if, for example, the detection of the amount of expansion is started at a time point of time $t_2$, the maximum value P or P' of the amount of expansion can easily be specified. Also, even in a case where a container (hereinafter referred to as the "large leak can") has so large a cause for leakage such that the amount of expansion of the container at preestablished time $t_2$ for starting the detection is unable to reach a measuring level V and the value of expansion is hardly changed during a period of time for measurement as in the graph D, the container can be detected as the leak can.

In an apparatus as shown in FIG. 1, in the case that the container has a pin hole, etc., the lamp is automatically lighted up. Moreover, as the first and second lamps 10a and 10b are selectively lighted up by determining whether the size of the pin hole, etc. is large or small, it can immediately be detected whether there is a pin hole, etc. in the container and whether the size of the pin hole, etc. is large or small.

As described in detail in the foregoing, according to a method of the present invention, there can easily be determined whether there is a pin hole, etc. in a container by monitaring the change of the amount of expansion of a container under a predetermined degree of reduced pressure.

Figure 3:
FIGS. 3a to 3c are schematic front views for explaining the change over time of the amount of expansion of the sealed container.
Figure 3:
Figure 3:

Also, in a method of the present invention, as various containers can be individually detected, a standard object or a standard value, etc. are not required. Accordingly, there can be obtained an absolute inspection irrespective of kind of a container, for example, an accommodating substance, material, shape, size, etc. FIGS. 3(a) through 3(c) concretely show this (in the illustrated examples, containers i and iii have no pin hole, etc. while a container ii is a leak can. Similarly, a container iv is a large leak can.).

That is, as described in the foregoing, according to a method of the present invention, as objective containers can individually be detected, even in a case as shown in FIG. 3(a) where containers are of the same kind (the heights thereof are all A under a normal pressure) but they have individual differences, the heights (amount of expansion) after expansion can be detected as inherent values a and c (a≠c) to the respective containers as shown by the containers i and iii (FIG. 3(b)). As such values can be maintained in time sequence (FIG. 3(c)), it can be determined that the containers i and iii have no pin hole, etc. From a fact that the height of the container ii after expansion exceeds a preestablished measuring level and the height b decreases to b' afterwards, it can be determined that the container has a pin hole, etc. In this way, there can be determined whether there are a pin hole, etc. even for same kinds of containers irrespective of individual differences thereof. Further, in a case of a container having a height not reaching the preestablished measuring level V, it can be detected as a large leak can without showing a large change of the amount of expansion from d to d' at a time when measuring.

The apparatus of FIG. 1 will be described in more detail. Material forming the lid member 1b constituting the chamber 1, can be selected from various materials such as plastic, ceramic, etc. as long as they do not block a magnetic field and they can maintain a vacuum.

Also, as an eddy-current displacement sensor which is applicable to the above-mentioned apparatus, there can be used, for example, item AH-422 of Kabushiki Kaisha Keyence. At that time, there can be used AS-440-10 of the same company as a controller.

Also, as a sealed container to which a method of the present invention is applicable, all kinds of containers (including bag-like containers) can be used irrespective of contents, material, shape, size, etc. However, in a case that the lid member is solely made of a nonconductive substance such as plastic, etc., it is necessary to provide a conductive material such as aluminium foil, etc. onto at least a part to be inspected (for example, a part of the lid) corresponding to a detecting surface of an eddy-current displacement sensor.

Also, the degree of vacuum required during the inspection is suitably changed depending on the container. The period of time required is also changed depending on the inspection condition. As one example, when the lid is formed of plastic and the container is laminated with aluminum foil at its inner surface, a required period of time was 20 to 30 seconds when the bore of a pin hole was $15\mu$ and a few seconds when the bore was $70\mu$ all under the condition that the degree of vacuum (degree of reduced pressure) was 400 to 500 mmHg at an inspecting time. Also, as a degree of vacuum applicable to an ordinary metallic can, there can be used 500 to 600 mmHg as a preferable range.

Although the method of the present invention has been described in a mode for carrying out the method, the present invention is not limited to the above-mentioned mode for carrying out the method.

For example, a leak inspecting device to be employed may, of course, be of a type which is capable of inspecting more than two sealed containers simultaneously. In that case, the same number of eddy-current displacement sensors as that of the containers which are accommodated in one chamber for inspection are disposed at predetermined positions of the chamber, and these eddy-current displacement sensors are all controlled by a control device. In this case, although the number of containers which are inspected simultaneously is not particularly limited, it is preferably 10 to 100 from a view point of practical use and an industrial view point.

What is claimed is:

1. A method for inspecting leakage of a sealed container, comprising:
   providing a vacuum chamber;
   arranging at least one displacement sensor on a part of the vacuum chamber;
   changing an internal pressure of the vacuum chamber to a predetermined degree of vacuum from a normal pressure after putting a sealed container to be inspected in the chamber;
   setting a predetermined measuring level of expansion which said sealed container should at least attain under said degree of vacuum in the absence of a relative large leakage hole in the container;
   first detecting any amount of expansion of said sealed container at said degree of vacuum over a certain time sequence by said sensor;

identifying a relatively large leakage hole in the container if the container fails to attain said predetermined measuring level of expansion during said time sequence;

determining a maximum value of expansion above said predetermined measuring level of expansion of the sealed container during said time sequence; and second detecting any change in the amount of expansion after a time when the detected amount of expansion shows the maximum value, thereby identifying a leakage hole smaller than said relatively large leakage hole formed in said sealed container.

2. A method for inspecting leakage of a sealed container according to claim 1, including providing a conductive material on at least a portion of the sealed container prior to putting the container in the vacuum chamber.

3. A method according to claim 2, including arranging said sensor as an eddy-current displacement sensor.

4. A method according to claim 1, including arranging a plurality of displacement sensors on a part of the vacuum chamber, and placing a number of sealed containers to be inspected in said vacuum chamber simultaneously so that each container is in operative relation to a different one of the displacement sensors.

5. A method according to claim 4, including controlling all of the displacement sensors with a common control device.

* * * * *